(12) United States Patent
Harris

(10) Patent No.: US 12,214,885 B2
(45) Date of Patent: Feb. 4, 2025

(54) CONTROLLING MOVEMENT OF A TABLE IN AN AIRCRAFT PASSENGER SUITE

(71) Applicant: Safran Seats GB Limited, Wales (GB)

(72) Inventor: Richard W. Harris, Wales (GB)

(73) Assignee: Safran Seats GB Limited, Cwmbran (GB)

(*) Notice: Subject to any disclaimer, the term of this patent is extended or adjusted under 35 U.S.C. 154(b) by 307 days.

(21) Appl. No.: 17/784,380

(22) PCT Filed: Dec. 15, 2020

(86) PCT No.: PCT/GB2020/053213
§ 371 (c)(1),
(2) Date: Jun. 10, 2022

(87) PCT Pub. No.: WO2021/123748
PCT Pub. Date: Jun. 24, 2021

(65) Prior Publication Data
US 2023/0046054 A1    Feb. 16, 2023

(30) Foreign Application Priority Data
Dec. 16, 2019  (GB) ..................................... 1918521

(51) Int. Cl.
*B64D 11/06* (2006.01)
*B60N 3/00* (2006.01)

(52) U.S. Cl.
CPC .......... *B64D 11/0605* (2014.12); *B60N 3/002* (2013.01); *B64D 11/0606* (2014.12); *B64D 11/0638* (2014.12)

(58) Field of Classification Search
CPC ............ B64D 11/0605; B64D 11/0606; B64D 11/0627; B64D 11/0638; B64D 11/06
See application file for complete search history.

(56) References Cited

U.S. PATENT DOCUMENTS

| 9,783,303 | B2* | 10/2017 | Gagnon | ............. | B64D 11/0605 |
| 2002/0109390 | A1* | 8/2002 | Hagiike | ............. | B64D 11/0643 |
| | | | | | 297/423.36 |

(Continued)

FOREIGN PATENT DOCUMENTS

| CN | 103010060 B | 12/2015 |
| EP | 3446920 A1 | 2/2019 |

(Continued)

OTHER PUBLICATIONS

Foreign Patent Literature (in English, the authoritative copy language) is provided with this office action as a PDF.*

(Continued)

*Primary Examiner* — Jason Holloway
*Assistant Examiner* — Benjamin J Brosh
(74) *Attorney, Agent, or Firm* — Kilpatrick Townsend & Stockton LLP

(57) ABSTRACT

An aircraft passenger suite (200) and method are provided. The aircraft passenger suite comprises a console (150) and a table (130) movably mounted to the console, the table being moveable along a table path between a first position and a second position. A controller (210) controls electro-mechanical movement of the table along the table path. The controller comprises an initiation input for receiving an instruction to initiate electro-mechanical movement of the table. The suite comprises sensing equipment for sensing if any obstacle is present on the table path and providing, to the controller, an indication of whether or not any obstacle is present on the table path. The controller is configured to prevent electro-mechanical movement of the table along the table path if the controller receives an indication that an obstacle is present on the table path.

19 Claims, 10 Drawing Sheets

(56) References Cited

U.S. PATENT DOCUMENTS

| | | | |
|---|---|---|---|
| 2013/0248653 A1* | 9/2013 | Round | B64D 11/0641 244/118.6 |
| 2014/0300148 A1* | 10/2014 | Frost | B64D 11/0638 297/173 |
| 2015/0158400 A1 | 6/2015 | Li | |
| 2015/0366337 A1 | 12/2015 | Luebke et al. | |
| 2016/0375810 A1* | 12/2016 | Kong | B60N 2/793 297/145 |
| 2018/0155034 A1* | 6/2018 | Thomaschewski | B64D 11/064 |
| 2019/0061491 A1* | 2/2019 | Hoggarth | B60J 5/0493 |
| 2020/0055436 A1* | 2/2020 | Garcia Sanchez | B60R 21/026 |
| 2020/0385124 A1* | 12/2020 | Zhang | F16H 21/44 |
| 2021/0221517 A1* | 7/2021 | Guy | B64D 11/0641 |
| 2021/0253009 A1* | 8/2021 | Wiepen | B60N 3/002 |

FOREIGN PATENT DOCUMENTS

| | | | |
|---|---|---|---|
| WO | WO-2017176811 A1 * | 10/2017 | |
| WO | 2019040952 A1 | 2/2019 | |

OTHER PUBLICATIONS

International Patent Application No. PCT/GB2020/053213, International Search Report and Written Opinion, dated Mar. 10, 2021.
United Kingdom Patent Application No. 1918521.4, Search Report, dated Sep. 17, 2020.

\* cited by examiner

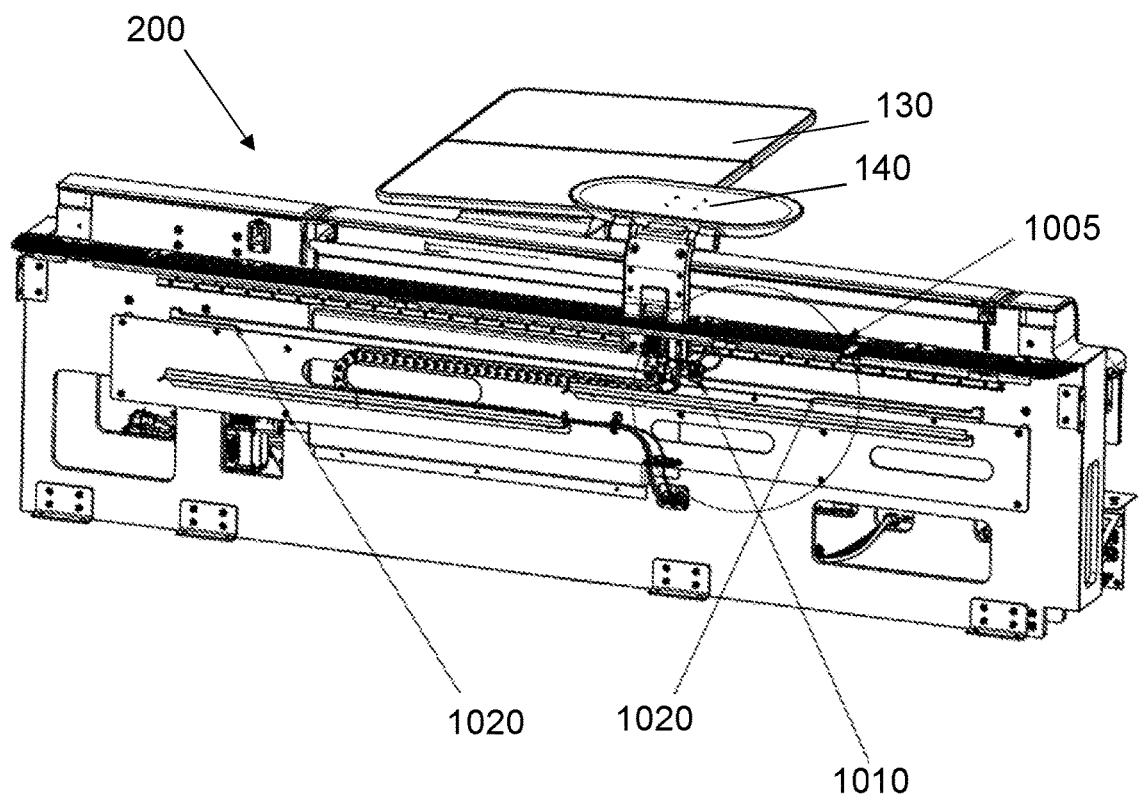
Fig. 10A
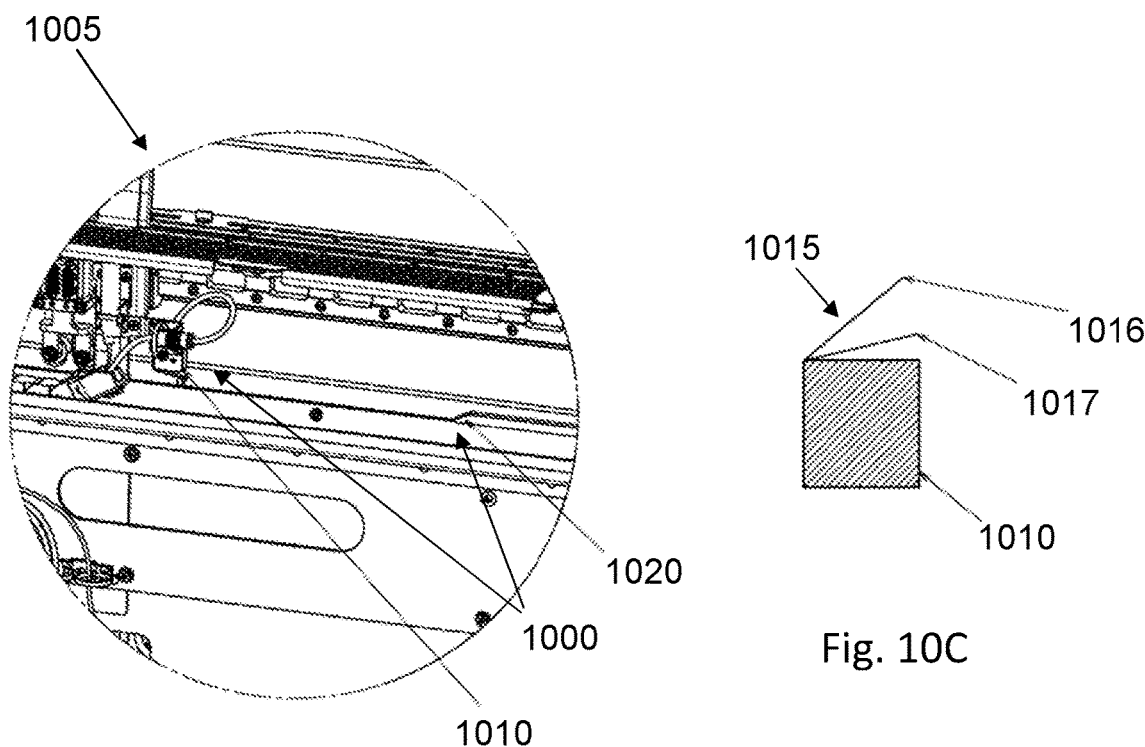
Fig. 10B
Fig. 10C

CONTROLLING MOVEMENT OF A TABLE IN AN AIRCRAFT PASSENGER SUITE

CROSS REFERENCE TO RELATED APPLICATION

This application is a national phase application of International Patent Application PCT/GB2020/053213, filed on Dec. 15, 2020 and titled "Controlling Movement of a Table in an Aircraft Passenger Suite," which is related to and claims priority to United Kingdom Patent Application No. 1918521.4, filed on Dec. 16, 2019, both of which are hereby incorporated by reference in their entireties.

BACKGROUND OF THE INVENTION

The present disclosure relates to aircraft passenger suites.

More particularly, but not exclusively, this invention concerns an aircraft passenger suite comprising a console and a table movably mounted to the console, the table being movable relative to the console along a table path between a first position and a second position. The invention also concerns a method of controlling movement of a table in an aircraft passenger suite.

Aircraft passenger suites may be provided, for example, in first class or business class sections of an aircraft. A suite typically comprises a seat for use by a passenger, and a shell structure which at least partially surrounds the seat. A suite can also include one or more consoles in the vicinity of the seat, and one or more tables, e.g. a meal table. The table may be moveable between a stowed configuration and a deployed configuration. The table is typically stowed during taxi, take-off and landing, and may be deployed by a passenger during flight when use of the table is desired. When the table is stowed, it may be housed within a console in the suite, e.g. a side-console located next to the seat.

However, stowing and/or deploying a table may be a cumbersome and/or complicated task for a passenger to perform, particularly when the table is to be stowed in a console of the suite. Further, a passenger may not always stow the table correctly (or at all) when it is required for the table to be stowed, e.g. during landing. The present invention seeks to mitigate the above-mentioned problems. Alternatively or additionally, the present invention seeks to provide an improved aircraft passenger suite and method of controlling movement of a table in an aircraft passenger suite.

SUMMARY OF THE INVENTION

The present invention provides, according to a first aspect, an aircraft passenger suite comprising a console and a table movably mounted to the console. The table is moveable relative to the console along a table path between a first position and a second position. The aircraft passenger suite comprises a controller for controlling electro-mechanical movement of the table along the table path. The controller comprises an initiation input for receiving an instruction to initiate electro-mechanical movement of the table. The aircraft passenger suite comprises sensing equipment for sensing if any obstacle is present on the table path and providing, to the controller, an indication of whether or not any obstacle is present on the table path. The controller is configured to prevent electro-mechanical movement of the table along the table path if the controller receives an indication that an obstacle is present on the table path.

Providing electro-mechanical movement of a table within an aircraft suite is more convenient for a passenger than a table that requires exclusively manual movement. This allows the deployment/stowage of the table to be controlled by a one-touch process (e.g. a passenger touches a button once and deployment/stowage of the table is initiated and continues until complete or until an object in the table path is detected). Such a one-touch process is easier, faster and/or more convenient than deploying and/or stowing the table manually. Further, such electro-mechanical movement can be performed in a more reliable and repeatable fashion compared to a case in which the passenger is required to move the table in a particular manner. In some cases, the passenger is not required to know or be informed how the table is to be moved, since the movement of the table is controlled by the controller. In some cases, initiation of the table movement is instructed from outside the suite. For example, when an aircraft is ready for landing, a signal may be provided to each passenger suite (e.g. from the cabin crew) to instruct initiation of table stowage. Therefore, the passenger need not be relied upon to correctly stow the table when the aircraft is ready for landing.

Moreover, by providing sensing equipment to sense if any obstacle is present on the table path, electro-mechanical movement of the table is made more reliable and/or safe. In particular, collisions between the table and other objects, and/or objects getting trapped or stuck, may be avoided. Control of the moveable table may thus be performed in an intelligent and reliable manner. Preferably, the sensing equipment is configured to sense if any obstacle is present further along the table path than the table, in the direction of travel of the table. Preferably, the sensing equipment is configured to sense if any obstacle is present on the table path without requiring contact between the table and the obstacle. Preferably, the sensing equipment is configured to sense if any obstacle, which the table could contact if electromechanical movement was initiated or continued, is present on the table path. Preferably, the sensing equipment is configured to sense if there is an obstacle along the table path, which the table may later contact.

The aircraft passenger suite may comprise an aircraft seat for use by a passenger. Preferably, the console is located adjacent to the seat. That is, the console may be located at a side of the seat. Hence, the console may comprise a side-console of the seat.

Movement of the table along the table path may involve moving the table into and/or out of the console. When the table is in the first position, the table may be substantially stowed within the console. Hence, the first position may be referred to as a "stowed position". This is more spatially efficient than stowing the table outside of the console. In such examples, the console comprises a stowage compartment for stowing the table. Preferably, the console comprises a lid for covering the stowage compartment. When the table is in the second position, the table may be external to the console. The second position may be referred to as a "deployed position". Therefore, deploying the table may comprise moving the table from the first position to the second position, and stowing the table may comprise moving the table from the second position to the first position. The controller may be configured to electro-mechanically deploy the table and/or stow the table, according to examples. Preferably, the controller is configured to electro-mechanically lift the lid covering the stowage compartment of the console as part of the deployment/stowage process.

Preferably, the table comprises a bi-fold table. As such, the table comprises two portions connected by a hinge.

Deployment/stowage of the table may be performed when the table is in a folded configuration. When the table is fully deployed, the table may be unfolded for use by a passenger. Stowing the table in the folded configuration is more spatially efficient than stowing the table in an unfolded configuration.

In some examples, deployment/stowage of the table comprises several phases. At least some of these phases are performed using electro-mechanical actuation. In some cases, deployment/stowage is partly electro-mechanical (i.e. controlled by the controller), and partly manual (i.e. controlled by a passenger or crewmember). Preferably, in a first phase of deployment, the table is moved electro-mechanically out of the console. This may be a translational movement. In a second phase of deployment, the table is pivoted about a hinge. Pivoting the table may result in the table being moved from a vertical orientation to a horizontal orientation, for use by the passenger. "Vertical" and "horizontal" are used herein with respect to the suite when arranged in an aircraft cabin. That is, a vertical axis extends between the cabin floor and the cabin ceiling, and a horizontal axis extends substantially parallel to the cabin floor. Pivoting of the table may be performed manually or electro-mechanically. Preferably, the pivoting is performed electro-mechanically (e.g. using a motor controlled by the controller). This enables the pivoting to be performed in a controlled manner. The speed of the pivoting is dependent on the speed of the motor. In a third phase of deployment, where the table comprises a bi-fold table, the table is unfolded. Unfolding of the table may be performed manually or electro-mechanically.

Similarly, stowage of the table may comprise a first phase of folding, a second phase of pivoting, and a third phase of moving into the console. Moving the table from the first position to the second position may correspond to the first phase, the second phase and/or the third phase of deployment/stowage. Preferably, moving the table from the first position to the second position corresponds to the first phase of deployment (i.e. moving the table out of the console) or the third phase of stowage (i.e. moving the table into the console). In some cases, however, moving the table from the first position to the second position corresponds to the second phase of deployment/stowage (i.e. pivoting the table from a vertical orientation to a horizontal orientation, or from a horizontal orientation to a vertical orientation).

Preferably, when the table is in the unfolded state, the useable surface area of the table is at least 3000 cm$^2$. More preferably, the useable surface area of the table in the unfolded state is at least 4000 cm$^2$.

In some examples, when the table is in the deployed state, the table is configured to translate on a plane that is substantially parallel to the plane of the table. For example, the table may be able to translate towards and away from the aircraft seat. This may involve translating in a fore-and-aft direction. "Fore" and "aft" are used herein in relation to the suite when arranged in an aircraft cabin. Preferably, the table is configured to translate fore-and-aft by at least 10 cm, and more preferably by at least 15 cm, in either direction from a central position. Stowage of the table may involve translating the table to the central position. The central position may be adjacent to a stowage compartment of the console.

In some examples, when the table is in the deployed state, the table is configured to rotate about an axis that is substantially perpendicular to the plane of the table. Preferably, the table is configured to rotate by at least 75 degrees, and more preferably by at least 90 degrees, when in the deployed state. As such, a passenger is able to move the table to a convenient position for use.

Preferably, the suite further comprises a furniture item moveable along a furniture item path between a first position and a second position. The furniture item path intersects with the table path in an intersection zone of the furniture item path. The sensing equipment may be configured to sense whether or not the furniture item is in the intersection zone and provide, to the controller, an indication of whether or not the furniture item is in the intersection zone. As such, when the furniture item is in the intersection zone, the furniture item is an obstacle present on the table path. In some examples, the furniture item path comprises an intersection zone and at least one safe zone. When the furniture item is in the at least one safe zone, the furniture item is not an obstacle present on the table path. As such, the table may be deployed/stowed electro-mechanically when the furniture item is in a safe zone, but not when the furniture item is in the intersection zone.

Preferably, the furniture item comprises a second table. The second table may be smaller than the first table. For example, the first table may comprise a meal table, and the furniture item may comprise a cocktail table. Hence, electro-mechanical movement of the meal table may be controlled based on the position of the cocktail table within the suite.

The furniture item may be moveably mounted to the console. Preferably, the furniture item is slideably mounted on the console. In some examples, the furniture item is at least partially located above an upper surface of the console, the upper surface being the furthest surface from the floor of an aircraft cabin when the suite is arranged in the cabin. The furniture item may be able to slide in a fore-and-aft direction relative to the console. For example, the furniture item may be able to slide towards and away from the aircraft seat. This can allow a passenger to move the furniture item, and reach the furniture item more easily when seated in the aircraft passenger suite. Movement of the furniture item relative to the console may be electro-mechanically and/or manually driven.

In some examples, the furniture item path is substantially perpendicular to the table path where the furniture item path intersects with the table path. For example, in the intersection zone, the table may be moveable in a substantially vertical direction along the table path, and the furniture item may be moveable in a substantially horizontal direction along the furniture item path. The plane of the table may be orientated substantially vertically as the table moves along the table path. In examples where the furniture item comprises a second table, the plane of the second table may be orientated substantially horizontally as the second table moves along the furniture item path. The table and/or the furniture item are moveable in other directions and/or planes in alternative embodiments.

Preferably, the sensing equipment is partially arranged on the console and partially arranged on the furniture item. That is, the sensing equipment may be distributed between the console and the furniture item. Distributing the sensing equipment between the console and the furniture item facilitates accurate position detection of the furniture item relative to the console. The sensing equipment may comprise a sensor and a triggering apparatus useable to trigger the sensor. One of the sensor and the triggering apparatus may be arranged on the console, and the other of the sensor and the triggering apparatus may be arranged on the furniture item. In other examples, the sensing equipment is arranged only on the console or only on the furniture item. In some examples, the sensing equipment is arranged on the table.

The sensing equipment may comprise a Hall effect sensor and a magnet. In some examples, the Hall effect sensor is arranged on the furniture item and the magnet is arranged on the console. The console may comprise a magnetic strip arranged in a location corresponding to the intersection zone. In other examples, the Hall effect sensor is arranged on the console, and the magnet is arranged on the furniture item. The Hall effect sensor may be arranged on the console in a location corresponding to the intersection zone. In either case, the magnitude of the magnetic field detected by the Hall effect sensor, and thus the output of the Hall effect sensor, is dependent on the position of the furniture item along the furniture item path.

In some examples, the sensing equipment comprises a rotary sensor, a cable reel coupled to the rotary sensor, and a cable. The cable is wound around the cable reel such that movement of the furniture item relative to the console causes the cable reel to rotate. Rotation of the cable reel is sensed by the rotary sensor. In some examples, the cable reel is fixed to the console, and the cable is attached to the furniture item. In other examples, the cable reel is attached to the furniture item, and the cable is attached to the console. In either case, the output of the rotary sensor is dependent on the position of the furniture item along the furniture item path.

The sensor equipment may comprise a snap-action switch. For example, the sensor equipment may comprise a micro-switch. The switch may comprise a mechanical lever. The configuration of the switch may be changed from "on" to "off", or vice-versa, based on the position of the lever. The sensing equipment may also comprise a structure shaped to actuate the lever when the furniture item moves into or out of the intersection zone. The structure may be located on the console and the switch may be arranged on the furniture item. In other examples, the switch is arranged on the console, and the structure is located on the furniture item. In either case, the on/off configuration of the switch is dependent on the position of the furniture item along the furniture item path.

In some examples, the sensor equipment comprises distance measurement equipment. The controller may be configured to determine a position of the furniture item based on distance input received from the distance measurement equipment. The distance measurement equipment may comprise a signal emitter for emitting a signal at a first time, and a signal receiver for receiving the signal at a second time, a time lag between the first and second times corresponding to the distance being measured. The signal emitter may emit an infrared or an ultrasound signal, for example. In some examples, the signal emitter and receiver are located substantially adjacent each other (e.g. both located on the console). In other examples, one of the emitter and the receiver is located on the console and the other of the emitter and the receiver is located on the furniture item.

In some examples, the controller is configured to receive an instruction to initiate electro-mechanical movement of the table, and initiate electro-mechanical movement of the table in response to receiving the instruction. The instruction may be received due to actuation of a button or other user-control mechanism, for example. Movement of the table may be in either direction along the table path, e.g. from the first position towards the second position, or from the second position towards the first position. Hence, electro-mechanical movement of the table may act to stow the table or deploy the table. The controller is configured to receive, after initiating electro-mechanical movement of the table, an indication of whether or not an obstacle is present on the table path. In response to a received indication that an obstacle is present on the table path, the controller is configured to cease electro-mechanical movement of the table. As such, electro-mechanical movement of the table may be started and subsequently stopped if/when an obstacle is detected.

In some examples, the controller is configured to receive an indication from the sensing equipment that an obstacle is present on the table path, receive an instruction to initiate electro-mechanical movement of the table, and prevent electro-mechanical movement of the table. Hence, due to the indication that an obstacle is present on the table path, the controller does not put into effect the instruction to initiate electro-mechanical movement of the table. In some examples, the controller is configured to receive a second, subsequent indication from the sensing equipment that no obstacle is present on the table path. In response to the second indication, the controller is configured to initiate electro-mechanical movement of the table along the table path. As such, the controller may first prevent, and then initiate and/or resume, electro-mechanical movement of the table. Preferably, electro-mechanical movement of the table is resumed regardless of whether or not a second, subsequent instruction to initiate electro-mechanical movement of the table is received. This allows the deployment/stowage of the table to be controlled by a one-touch process.

Preferably, the controller is configured to provide an alert if the controller receives an indication that an obstacle is present on the table path. The alert is used to notify a passenger and/or crewmember that an obstacle is present on the table path. The alert may comprise a visual alert. In some examples, the controller is configured to provide a visual alert displayed on or near the furniture item. For example, a light on a surface of the furniture item may be turned on. The light may comprise a flashing light. This enables a passenger to be notified that it is the furniture item in particular that is preventing electro-mechanical movement of the table. Additionally or alternatively, a visual alert may be displayed via a display system of the aircraft passenger suite. When the passenger moves the furniture item out of the intersection zone, electro-mechanical movement of the table may be initiated and/or resumed, and/or the alert may be turned off.

According to a second aspect of the invention there is provided a method of controlling electro-mechanical movement of a table in an aircraft passenger suite, the table being moveably mounted to a console and moveable relative to the console along a table path between a first position and a second position. The method comprises: receiving an instruction to initiate electro-mechanical movement of the table; receiving, from sensing equipment, an indication of whether or not an obstacle is present on the table path; and preventing electro-mechanical movement of the table if an indication that an obstacle is present on the table path is received. Preferably, the obstacle detected is further along the table path than the table, in the direction of travel of the table. Preferably, the obstacle is situated in a position along the table path that would mean the table would later contact the obstacle if electromechanical movement was initiated or continued. Preferably, the electromechanical movement of the table is prevented before the table could make contact with the obstacle.

Electro-mechanical movement of the table may comprise stowage and/or deployment of the table. In some examples, the method comprises initiating electro-mechanical movement of the table in response to receiving the instruction. After initiating movement of the table, an indication of whether or not an obstacle is present on the table path may be received. In response to a received indication that an obstacle is present on the table path, movement of the table may be ceased. In other words, electro-mechanical deployment and/or stowage of the table may be started, and then may be stopped if/when an obstacle is sensed in the path of deployment/stowage.

In some examples, the method comprises, in the following order: receiving an indication from the sensing equipment that an obstacle is present on the table path; receiving an instruction to initiate electro-mechanical movement of the table; and preventing electro-mechanical movement of the table. As such, if an indication is received indicating that an obstacle is present on the table path, then the electro-mechanical movement of the table is prevented regardless of a received instruction to initiate electro-mechanically movement.

In some examples, the method comprises receiving an indication from the sensing equipment of whether or not an obstacle is present on the table path, and in response to a received indication that no obstacle is present on the table path, initiating electro-mechanical movement of the table along the table path. Initiating electro-mechanical movement may comprise resuming electro-mechanical movement. For example, electro-mechanical movement of the table may be ceased when an obstacle is detected on the table path, and then resumed when no obstacle is detected on the table path. In some examples, the resumption may be performed in the absence of a further instruction to initiate electro-mechanical movement.

According to a third aspect, there is provided a table control apparatus for use in an aircraft passenger suite. The table control apparatus comprises a console and a table movably mounted to the console. The table is moveable relative to the console along a table path between a first position and a second position. The table control apparatus comprises a controller for controlling electro-mechanical movement of the table along the table path. The controller comprises an initiation input for receiving an instruction to initiate electro-mechanical movement of the table. The table control apparatus also comprises a furniture item movably mounted to the console. The furniture item is moveable along a furniture item path between a first position and a second position. The furniture item path intersects with the table path in an intersection zone of the furniture item path. The table control apparatus comprises sensing equipment for sensing whether or not the furniture item is in the intersection zone. The controller is configured to prevent electro-mechanical movement of the table along the table path if the controller receives an indication that the furniture item is in the intersection zone.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIGS. 10A to 10C show the table control apparatus according to a fourth embodiment.

DETAILED DESCRIPTION

Figure 1:
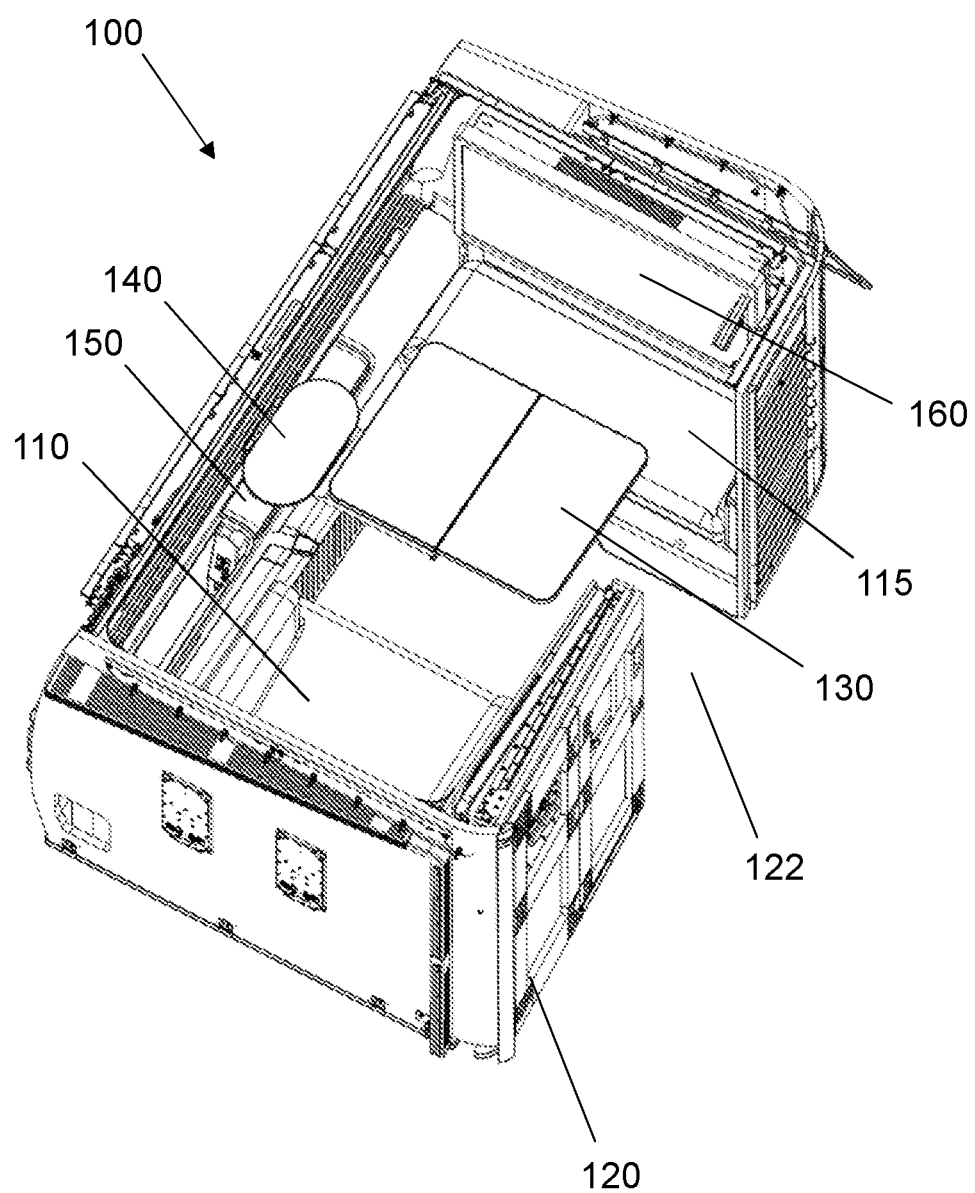
FIG. 1 shows a perspective view of an aircraft passenger suite according to a first embodiment of the invention.

FIG. 1 shows a perspective view of an aircraft passenger suite 100 in accordance with a first embodiment of the present invention.

The suite 100 includes an aircraft seat 110, and an ottoman 115 located opposite the seat 110, which provides a footrest function for a passenger sat in the seat 110. The suite 100 also includes a shell structure 120, or shroud, which defines the boundary of the suite 100. The shell structure 120 has a gap 122 to allow entrance/exit to the suite 100.

The suite 100 comprises a meal table 130. The meal table 130 can be deployed for use by a passenger, and stowed when the meal table 130 is not required. The meal table 130 may also be stowed during particular events, such as taxi, take-off and landing (TTL). The meal table 130 is a bi-fold table in this embodiment. Unfolding of the bi-fold table forms part of the deployment procedure, and folding of the bi-fold table forms part of the stowage procedure. The meal table 130 is movably mounted on a console 150, and can be stowed within the console 150. This will be described in more detail below. The console 150 is arranged adjacent to the seat 110. Hence, the console 150 comprises a side-console. The console 150 is located between the seat 110 and a side-wall of the shell structure 120.

The suite 100 also comprises a cocktail table 140. The cocktail table 140 is useable by the passenger even when the meal table 130 is stowed. The cocktail table 140 is mounted on the console 150, and is slideable along an upper surface of the console 150, as will be described in more detail below.

The suite 100 is also provided with a display system 160. The suite 100 may comprise more, fewer and/or different components in other examples.

Figure 2A:
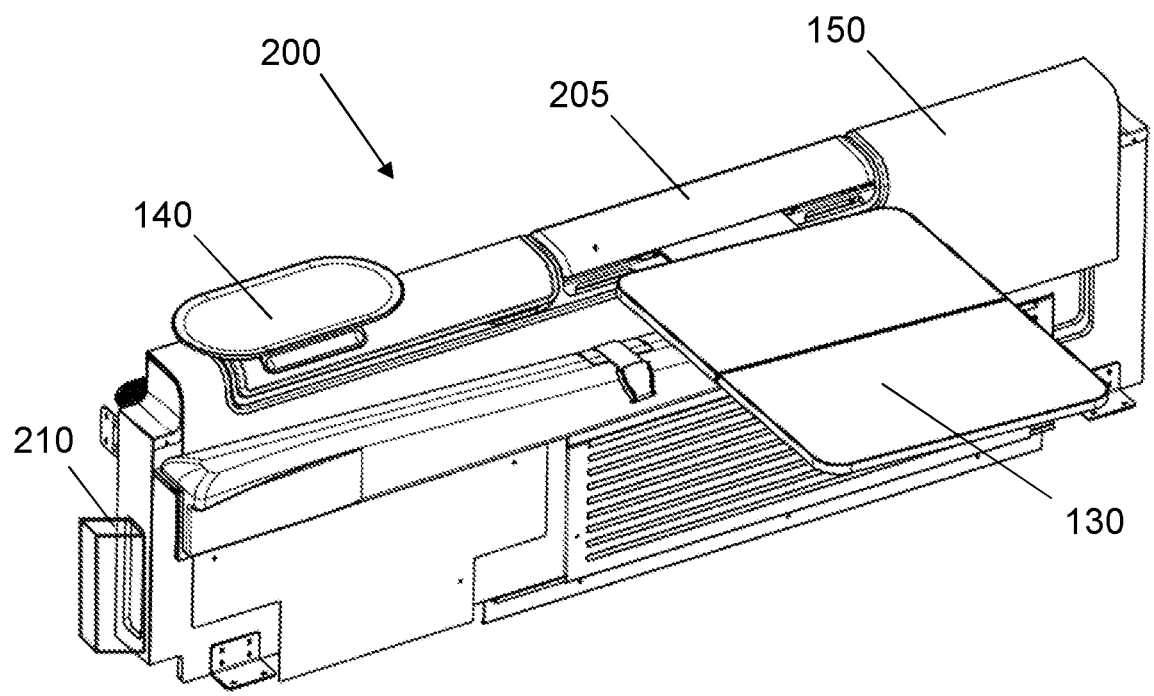
FIGS. 2A and 2B show perspective views of a table control apparatus according to the first embodiment.
Figure 2B:
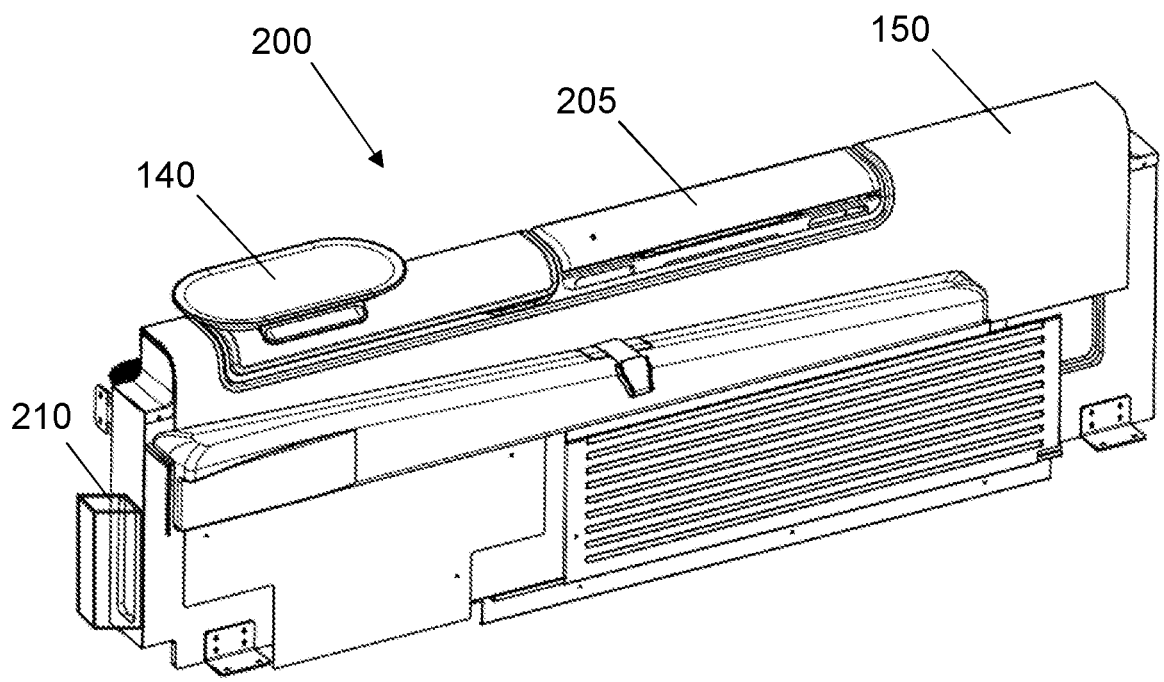

FIGS. 2A and 2B show perspective views of a table control apparatus 200 in accordance with the first embodiment. The apparatus 200 can be used in the aircraft passenger suite 100 described with reference to FIG. 1 above. The apparatus 200 comprises the meal table 130, cocktail table 140 and console 150. The console 150 comprises a lid 205 for covering a stowage compartment (not shown) of the console 150.

The apparatus 200 also comprises a controller 210 for controlling electro-mechanical movement of the meal table 130. The controller 210 comprises a processing system. The processing system comprises one or more processors and/or memory. The controller 210 is configured to receive instructions and/or electronic signals and to control electro-mechanical movement of the meal table 130 based on such instructions and/or signals.

FIG. 2A shows the meal table 130 in a deployed position. In FIG. 2B, the meal table 130 is stowed within the console 150.

The apparatus 200 may comprise more, fewer and/or different components in other examples. In some examples, the controller 210 is not provided as part of the apparatus 200. In such examples, movement of the meal table 130 may be controlled remotely (i.e. the controller 210 may be arranged at a different location to the apparatus 200). In some examples, the apparatus 200 does not include the cocktail table 140.

Figure 3A:
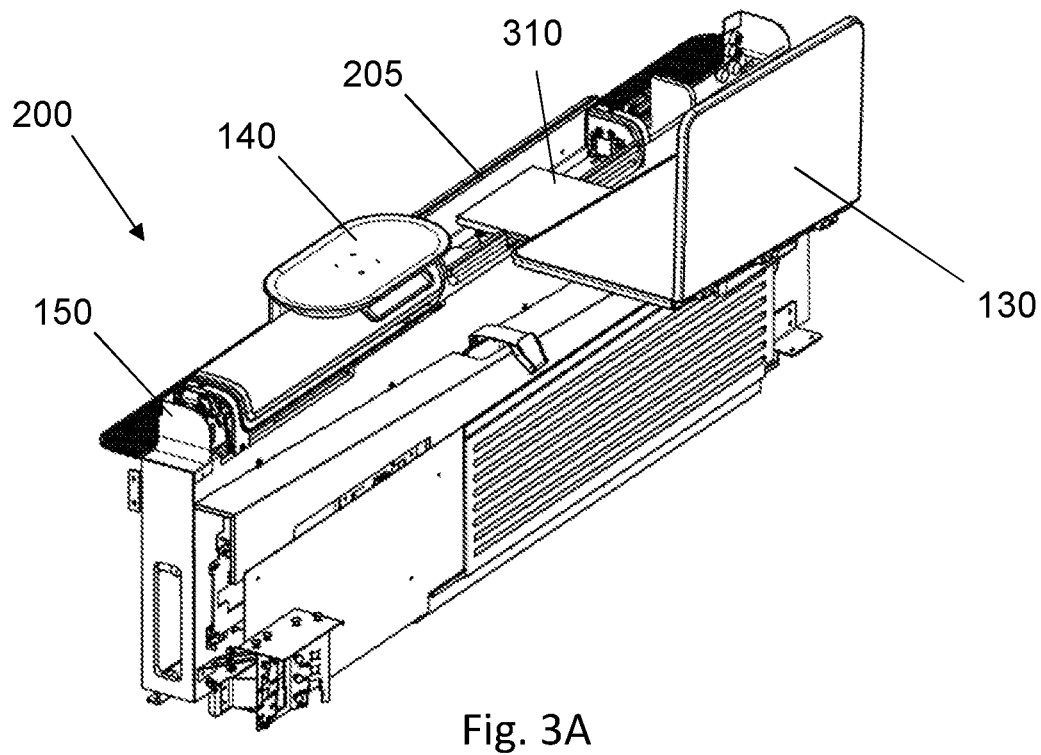
FIGS. 3A and 3B show perspective views of the table control apparatus according to the first embodiment.
Figure 3B:
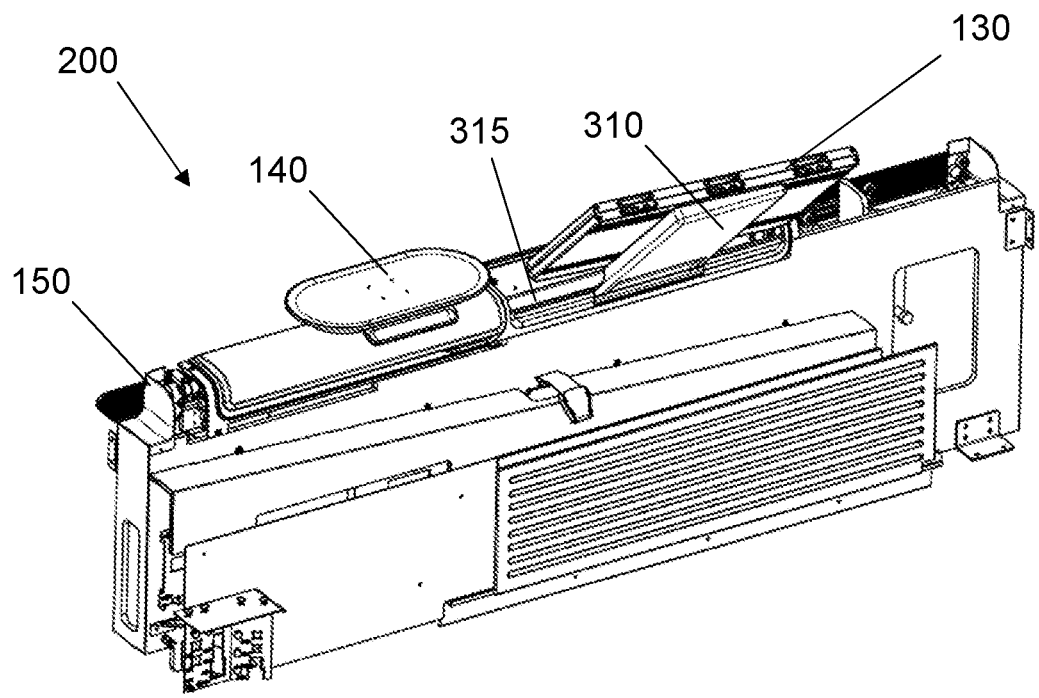

FIGS. 3A and 3B show perspective views of the table control apparatus 200 of the first embodiment, in which the meal table 130 is moving between a deployed configuration and a stowed configuration.

In FIG. 3A, the meal table 130 is folded about a hinge that extends along the centre of the meal table 130. This makes the meal table 130 more compact for stowage. Further, when the meal table 130 is in the folded configuration, it can be used by the passenger as a work surface or the like.

In FIG. 3B, the folded meal table 130 is pivoted to allow entry into the console 150. Pivoting the folded meal table 130 involves moving the folded meal table 130 from a horizontal orientation (i.e. substantially parallel to a cabin floor when the suite 100 is arranged in a cabin) to a vertical orientation (i.e. substantially perpendicular to the cabin floor when the suite 100 is arranged in a cabin). The meal table 130 is mounted to the console 150 via a support arm 310. The support arm 310 pivots about a hinge 315 attached to the base of the support arm 310, thereby causing the meal table 130 to pivot from the horizontal orientation towards the vertical orientation. Rotation of the support arm 310 is performed electro-mechanically (e.g. driven by a motor) in this embodiment. When the meal table 130 is in the vertical orientation, the meal table 130 can be translated downwards and into the console 150, thereby stowing the meal table 130. Translation of the meal table 130 is performed electro-mechanically (e.g. driven by a motor) in this embodiment. Further, the lid 205 is electro-mechanically opened to allow the meal table 130 to enter the console 150. Similarly, to deploy the meal table 130, the meal table 130 can be translated upwards and out of the console 150, then pivoted into a horizontal orientation, and finally unfolded.

Electro-mechanical movement of the meal table 130 into and/or out of the console 150 is performed by an actuator mechanism (not shown) controlled by the controller 210. The actuator mechanism is housed within the console 150. The actuator mechanism may include gears, levers, rotary dampers, guides and/or motors, for example. Deployment/stowage of the meal table 130 is actuated by pressing a control button (not shown), which may be on or near the console 150. Pressing of the control button causes an instruction to be sent to the controller 210 to initiate electro-mechanical movement of the meal table 130 using the actuator mechanism. The control button is provided with a "press and hold" feature to avoid accidental deployment/stowage, in this embodiment. In addition to receiving instructions via actuation of the control button, the controller 210 is configured to receive and process inputs from sensing equipment, as will be described in more detail below.

Figure 4A:
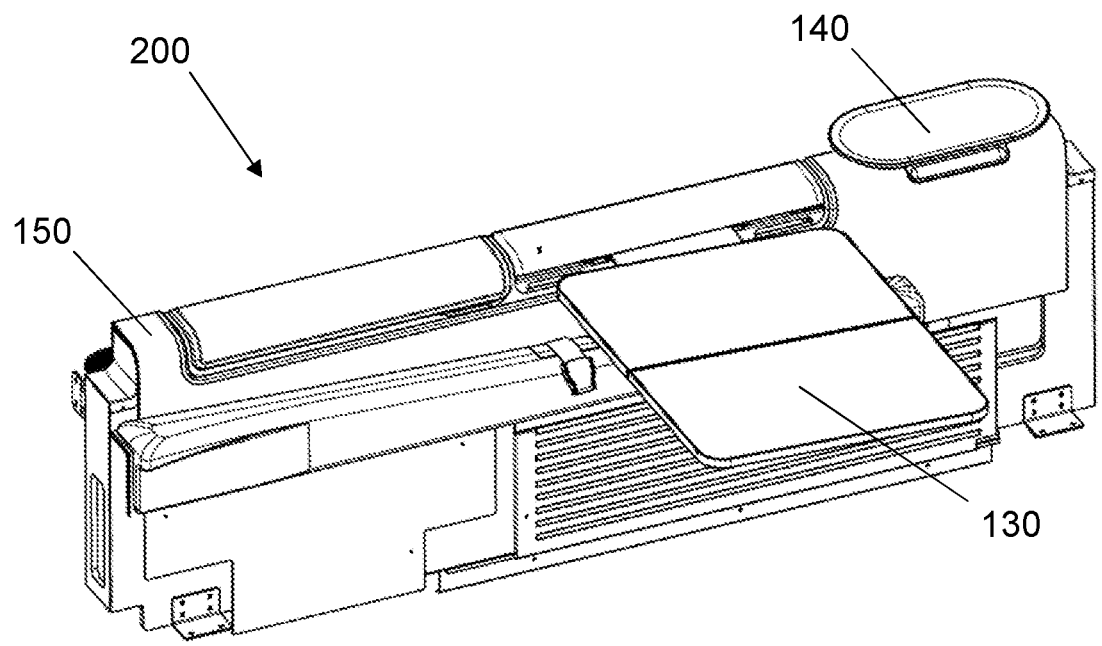
FIGS. 4A and 4B show perspective views of the table control apparatus according to the first embodiment.
Figure 4B:
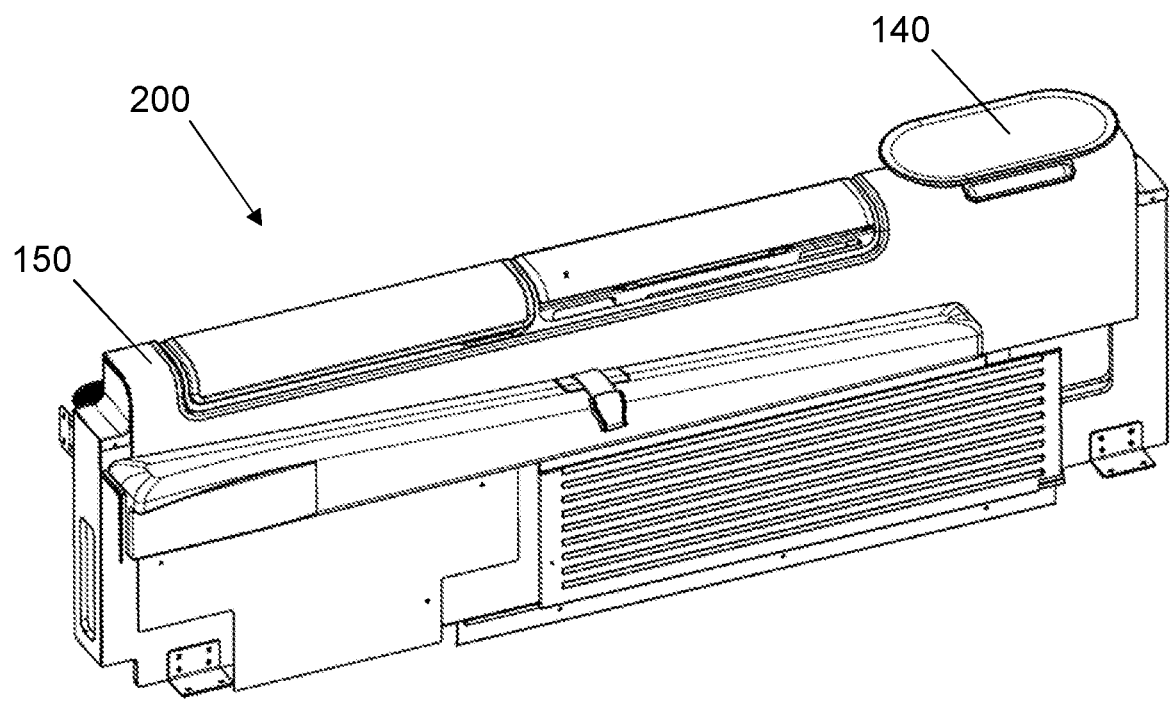

As discussed above, the cocktail table 140 can slide along the upper surface of the console 150. The cocktail table 140 is moveable along a cocktail table path. In FIGS. 2A and 2B, the cocktail table 140 is in an aft-most position along the cocktail table path. Turning to FIGS. 4A and 4B, the cocktail table 140 is in a fore-most position along the cocktail table path. "Aft" and "fore" as used herein relate to the suite 100 when arranged in an aircraft, with the seat 110 facing in the fore direction. In FIG. 4A, the meal table 130 is deployed, and in FIG. 4B, the meal table 130 is stowed. In the configurations shown in FIGS. 2A and 2B, 3A and 3B, and 4A and 4B, the cocktail table 140 does not obstruct the movement of the meal table 130 into and/or out of the console 150.

Figure 5A:
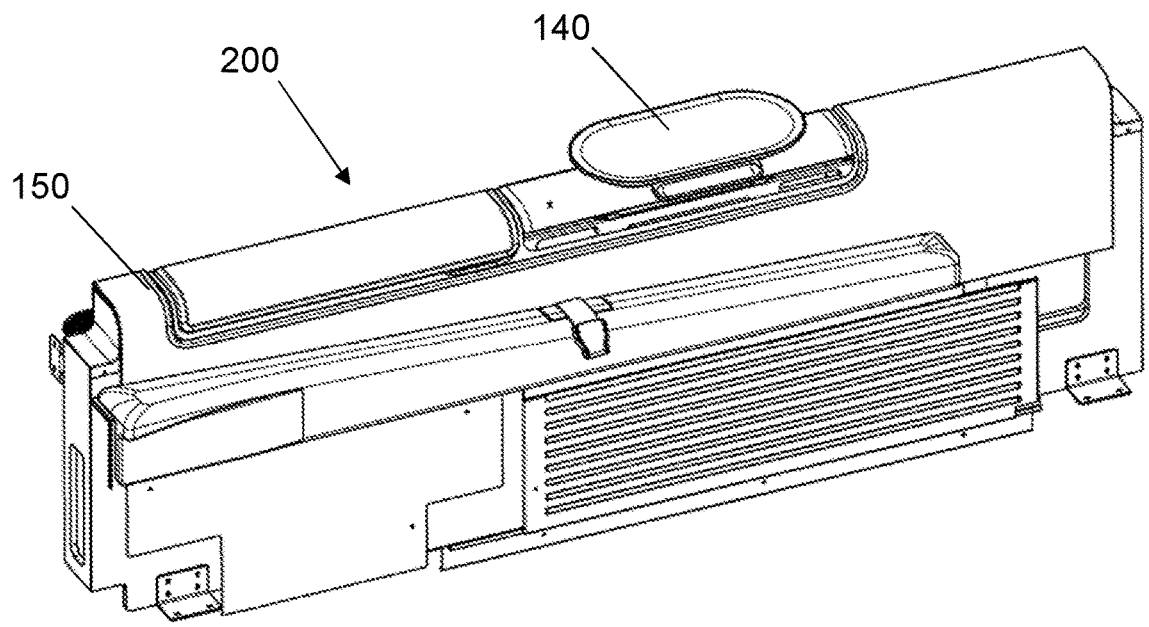
FIGS. 5A and 5B show perspective views of the table control apparatus according to the first embodiment.
Figure 5B:
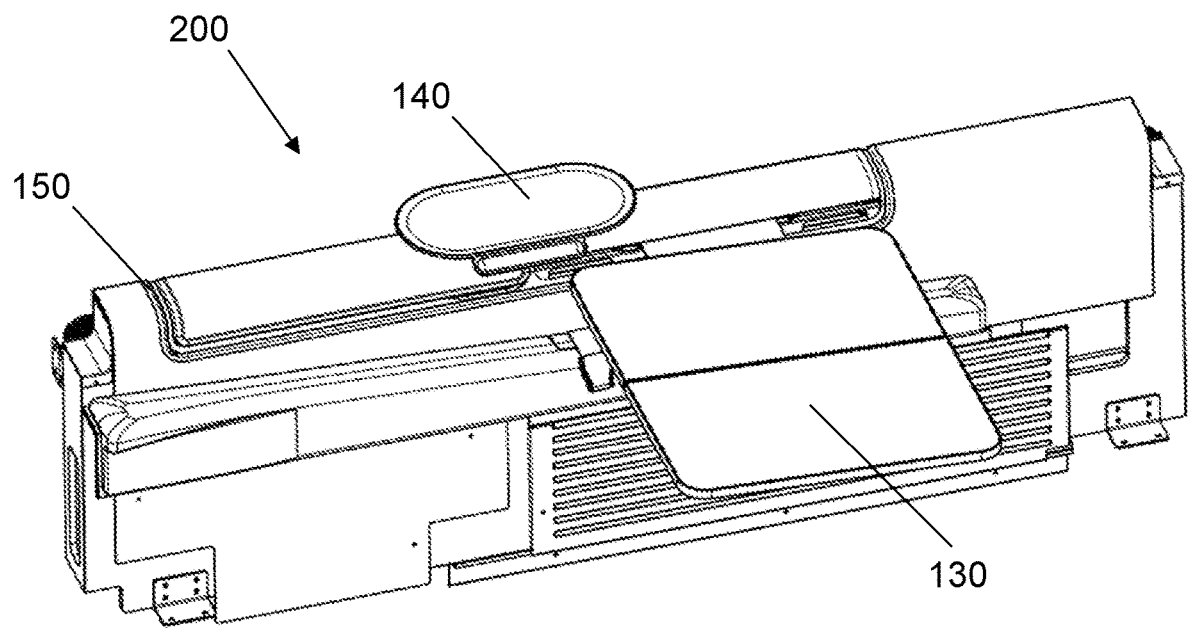

FIGS. 5A and 5B show perspective views of the table control apparatus 200 when the cocktail table 140 is intermediate the aft-most position and the fore-most position.

In FIG. 5A, the meal table 130 is stowed within the console 150. The cocktail table 140 is positioned at a location on the cocktail table path such that the cocktail table 140 obstructs movement of the meal table 130 out of the console 150. Therefore, the cocktail table 140 is an obstacle on the meal table path.

In FIG. 5B, the meal table 130 is in the deployed configuration. The cocktail table 140 is positioned at a location on the cocktail table path such that the cocktail table 140 obstructs movement of the meal table 130 into the console 150. Therefore, the cocktail table 140 is an obstacle on the meal table path.

Figure 6:
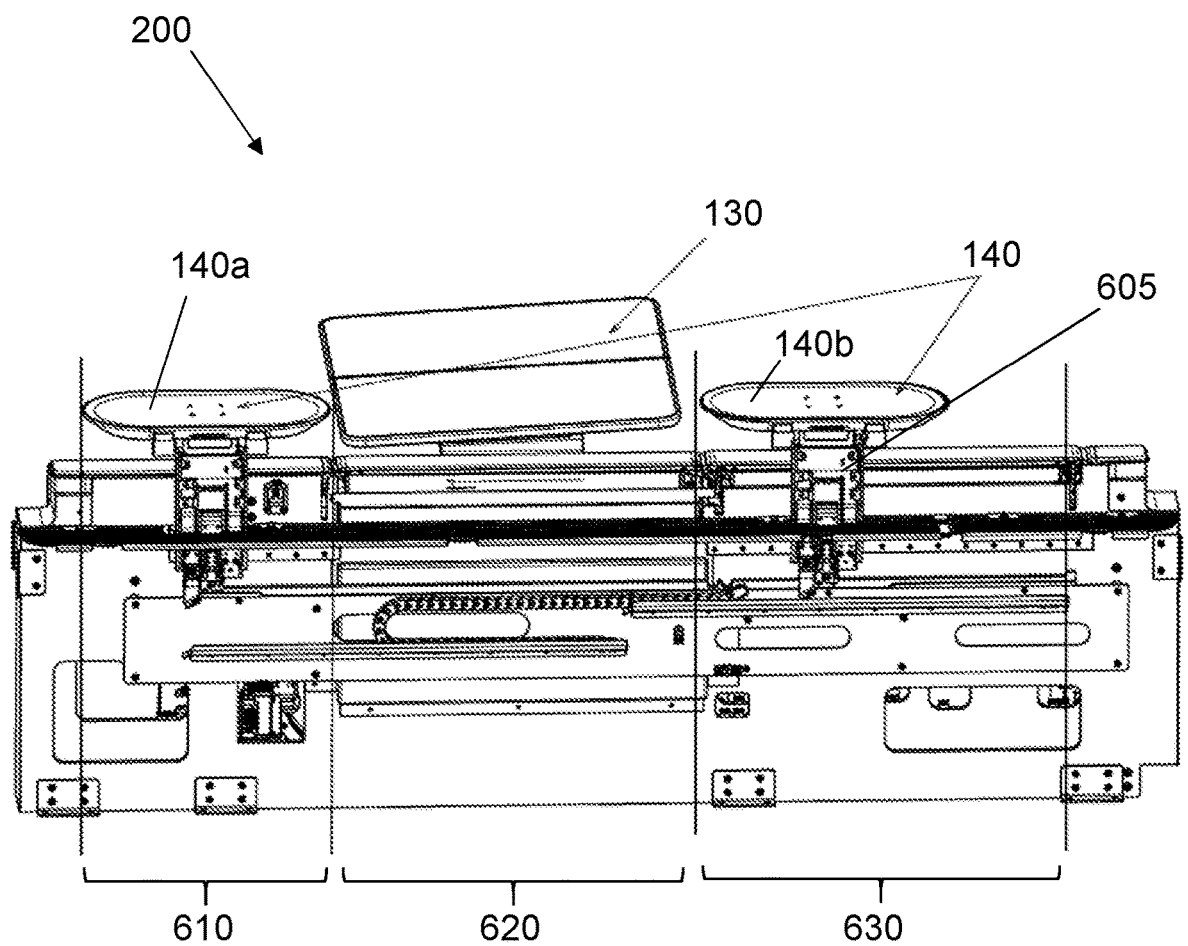
FIG. 6 shows a side view of the table control apparatus according to the first embodiment.

FIG. 6 shows a side view of the table control apparatus 200 according to the first embodiment. In FIG. 6, the cocktail table 140 is shown in two positions 140a, 140b, to illustrate that the cocktail table 140 can translate along a path that is substantially the length of the console 150. The meal table 130 is shown in the deployed configuration. The cocktail table 140 is mounted to the console 150 via a linkage arm 605. The linkage arm 605 is movably coupled to a track on the console 150, to allow the cocktail table 140 to translate along the console 150.

The cocktail table path comprises a first safe zone 610, an intersection zone 620, and a second safe zone 630. When the cocktail table 140 is in one of the safe zones 610, 630, the cocktail table 140 does not obstruct movement of the meal table 130. When the cocktail table 140 is in the intersection zone 620, the cocktail table 140 does obstruct movement of the meal table 130. Electro-mechanical movement of the meal table 130 is prevented when the cocktail table 140 is in the intersection zone 620.

Figure 7:
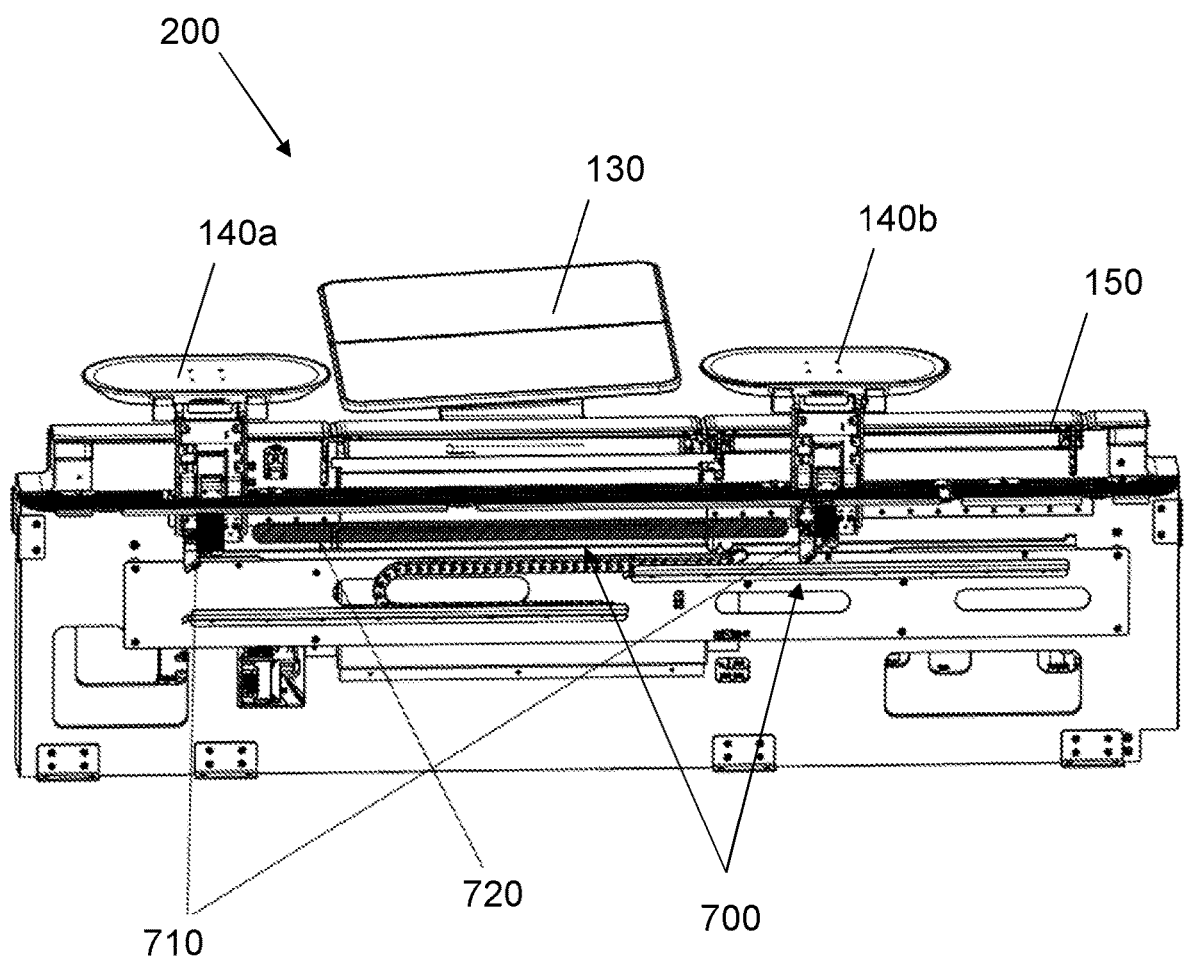
FIG. 7 shows a side view of the table control apparatus according to the first embodiment.

FIG. 7 shows a side view of the table control apparatus 200 according to the first embodiment. The apparatus 200 comprises sensing equipment 700. The sensing equipment 700 is for sensing whether or not the cocktail table 140 is in the intersection zone 620.

In this embodiment, the sensing equipment 700 comprises a Hall effect sensor 710 and a magnetic strip 720. The Hall effect sensor 710 is coupled to the cocktail table 140. In particular, the Hall effect sensor 710 is arranged on the linkage arm 605. The magnetic strip 720 is arranged on the console 150, in a region corresponding to the intersection zone 620. If the cocktail table 140 is in the intersection zone 620, the Hall effect sensor 710 generates an output due to the proximity of the magnetic strip 720. Such an output indicates that the cocktail table 140 is in an obstructing position for movement of the meal table 130. The output of the Hall effect sensor 710 is provided to the controller 210. If the controller 210 receives an indication from the Hall effect sensor 710 that the cocktail table 140 is in an obstructing position, the controller 210 prevents electro-mechanical movement of the meal table 130. If the controller 210 does not receive an indication that the cocktail table 140 is in an obstructing position (e.g. if the controller 210 receives an indication that the cocktail table 140 is in one of the safe zones 610, 630), electro-mechanical movement of the meal table 130 is not prevented. The magnetic strip 720 may alternatively be arranged in a region corresponding to one or more of the safe zones 610, 630 in other examples. It should be noted that, although the cocktail table 140 and Hall effect sensor 710 are depicted twice in FIG. 7, this is intended to illustrate different positions 140a, 140b of the cocktail table 140 relative to the console 150. In other examples, however, more than one cocktail table 140 may be provided.

Figure 8:
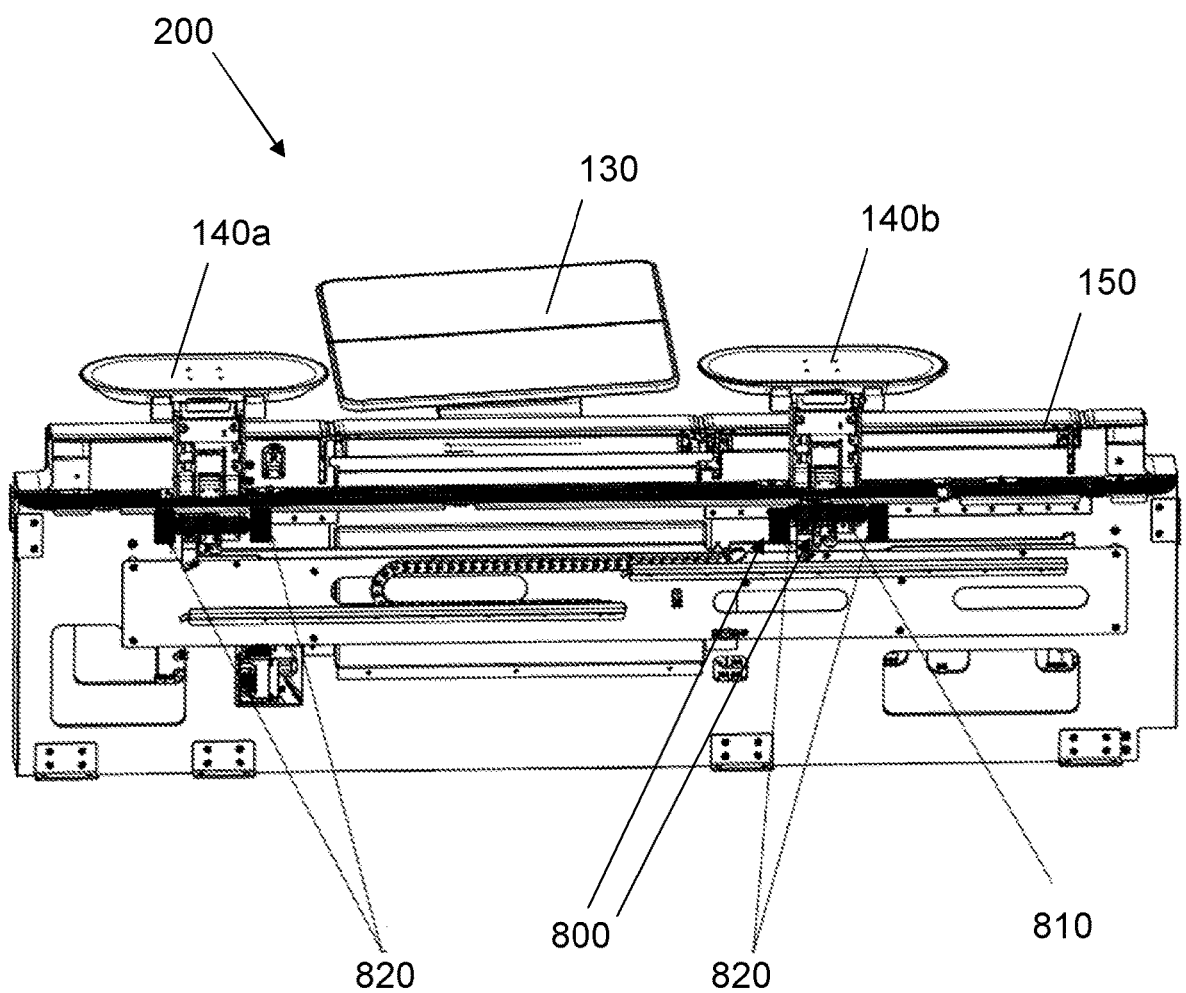
FIG. 8 shows a side view of the table control apparatus according to a second embodiment.

FIG. 8 shows a side view of the table control apparatus 200 according to a second embodiment.

In this embodiment, the apparatus 200 comprises sensing equipment 800 comprising a magnet 810 coupled to the cocktail table 140, and a plurality of Hall effect sensors 820 arranged on the console 150. The Hall effect sensors 820 are arranged in a region corresponding to the safe zones 610, 630. When the cocktail table 140 is in the safe zones 610, 630, the proximity of the magnet 810 causes one or more of the Hall effect sensors 820 to generate an output, which is received by the controller 210. This allows the controller 210 to determine the position of the cocktail table 140, and hence determine whether or not the cocktail table 140 will obstruct electro-mechanical movement of the meal table 130. One or more of the Hall effect sensors 820 may be arranged in a region corresponding to the intersection zone 620 in other examples. Providing a plurality of Hall effect sensors 820 at different locations on the console 150 enables the position of the cocktail table 140 relative to the console 150 to be more accurately determined.

Figure 9:
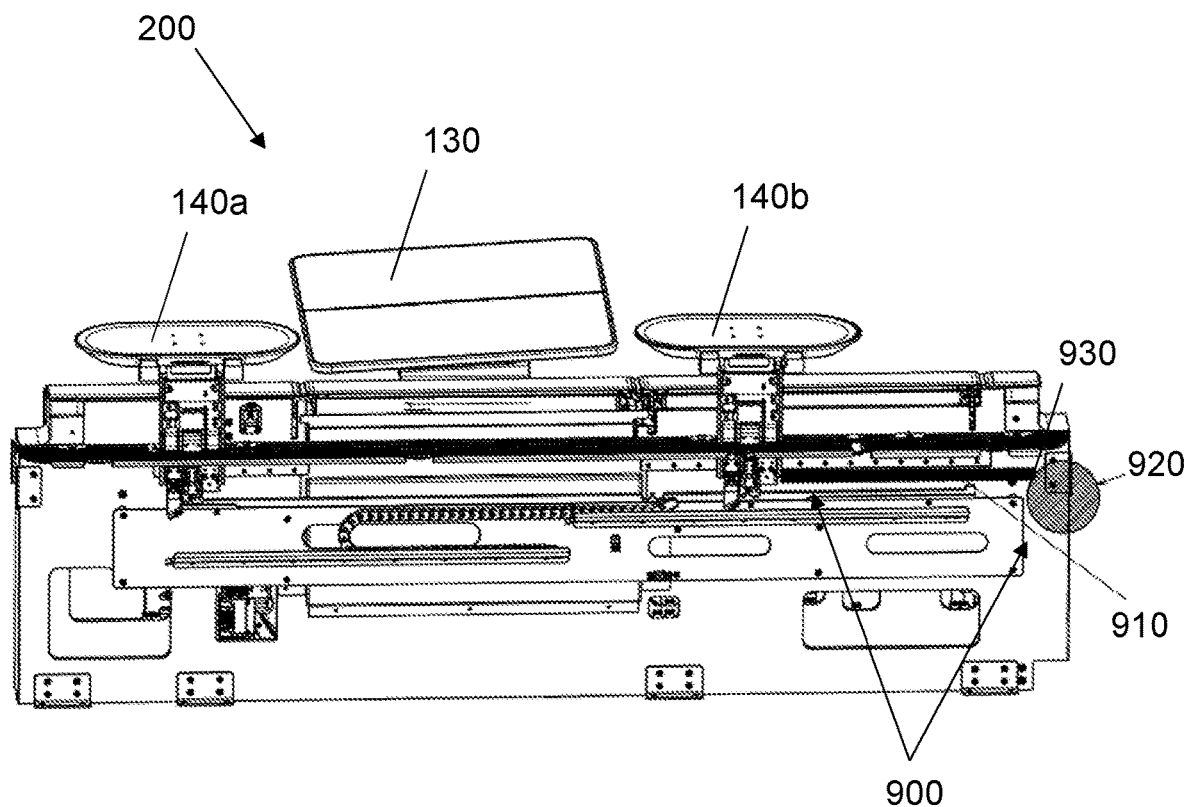
FIG. 9 shows a side view of the table control apparatus according to a third embodiment.

FIG. 9 shows a side view of the table control apparatus 200 according to a third embodiment.

In this embodiment, the apparatus comprises sensing equipment 900 comprising a cable 910, a cable reel 920, and a rotary sensor 930. The cable reel 920 is attached to the console 150. The cable 910 is wound around the cable reel 920 and attached to the cocktail table 140. Therefore, movement of the cocktail table 140 relative to the console 150 causes rotation of the cable reel 920. The rotary sensor 930 is coupled to the cable reel 920 and generates an output dependent on the rotation of the cable reel 920. Hence, the position and/or movement of the cocktail table 140 can be determined and, if it is determined that the cocktail table 140 is in the intersection zone 620, electro-mechanical movement of the meal table 130 is prevented.

FIG. 10A shows a perspective view of the table control apparatus 200 according to a fourth embodiment. FIG. 10B shows a close-up view of a section 1005 of the apparatus 200.

In this embodiment, the apparatus 200 comprises sensing equipment 1000 comprising a snap-action switch 1010. The snap-action switch 1010 is shown schematically in FIG. 10C. The snap-action switch 1010 comprises a mechanical lever 1015. The lever 1015 is moveable between an open position 1016 and a closed position 1017. When the lever 1015 is in the open position 1016, the switch 1010 is "off". When the lever 1015 is in the closed position 1017, the switch 1010 is "on". The sensing equipment 1000 also comprises a structure 1020 that is shaped to actuate the lever 1015 when the cocktail table 140 moves into or out of the intersection zone 620. The structure 1020 comprises a CAM structure in this embodiment. The structure 1020 comprises a protruding region (operable to move the lever 1015 into the closed position 1017) in the safe zones 610, 630, and a non-protruding region (operable to move the lever 1015 into the open position 1016) in the intersection zone 620. Hence, the output of the switch 1010 is dependent on whether or not the cocktail table 140 is in the intersection zone 620. The output of the switch 1010 is received by the controller 210. If an indication is received that the cocktail table 140 is in the intersection zone 620, the controller 210 prevents electro-mechanical movement of the meal table 130.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In examples, described above, the furniture item is slideably mounted to the console. In other examples, the furniture item can move relative to the console in a different manner. For example, the furniture item may be pivotably moveable with respect to the console. In some examples, the furniture item is not mounted to the console. For example, the furniture item may be movably mounted to a shell structure of the aircraft passenger suite. In such a case, the furniture item path may still intersect with the table path.

In examples described above, the console comprises a side-console of the suite. In other examples, the console comprises a front-console of the suite (i.e. arrangeable in front of the seat).

In some examples, the furniture item path and the table path are substantially parallel, or are angled with respect to one another.

In some examples, the table is not substantially stowed in the console when the table is in the first position. For example, the table may be stowed by moving the table so as to be flat against an outer surface of the console, and outside of the console.

In some examples, an alert other than a visual alert is provided if the controller receives an indication that an obstacle is present on the table path. For example, the controller may be configured to provide an audio alert. In some examples, an alert is not provided.

Electro-mechanical movement of the table may be prevented due to the sensing of obstacles other than furniture items on the table path. Such obstacles may comprise body parts of a passenger, luggage items, or passenger belongings, for example.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:
1. An aircraft passenger suite comprising:
a console;
a table movably mounted to the console, the table being moveable relative to the console along a table path between a first position and a second position;
a controller for controlling electro-mechanical movement of the table along the table path, the controller comprising an initiation input for receiving an instruction to initiate electro-mechanical movement of the table; and sensing equipment for sensing if any obstacle is present on the table path and providing, to the controller, an indication of whether or not any obstacle is present on the table path, wherein the controller is configured to prevent electro-mechanical movement of the table along the table path if the controller receives an indication that an obstacle is present on the table path, and wherein the sensing equipment is configured to sense if any obstacle is present on the table path without requiring contact between the table and the obstacle.

2. The aircraft passenger suite according to claim 1, wherein the suite further comprises a furniture item moveable along a furniture item path between a first position and a second position, wherein the furniture item path intersects with the table path in an intersection zone of the furniture item path.

3. The aircraft passenger suite according to claim 2, wherein the furniture item is moveably mounted to the console.

4. The aircraft passenger suite according to claim 3, wherein the furniture item is slideably mounted on the console.

5. The aircraft passenger suite according to claim 2, wherein the furniture item path is substantially perpendicular to the table path where the furniture item path intersects with the table path.

6. The aircraft passenger suite according to claim 2, wherein the furniture item comprises a second table.

7. The aircraft passenger suite according to claim 2, wherein the sensing equipment is partially arranged on the console and partially arranged on the furniture item.

8. The aircraft passenger suite according to claim 2, wherein the sensing equipment comprises a Hall effect sensor and a magnet.

9. The aircraft passenger suite according to claim 2, wherein the sensing equipment comprises a rotary sensor, a cable reel coupled to the rotary sensor, and a cable that is wound around the cable reel such that movement of the furniture item relative to the console causes the cable reel to rotate.

10. The aircraft passenger suite according to claim 2, wherein the sensing equipment comprises a snap-action switch comprising a mechanical lever, and a structure shaped to actuate the lever when the furniture item moves into or out of the intersection zone.

11. The aircraft passenger suite according to claim 1, wherein, when the table is in the first position, the table is substantially stowed within the console.

12. The aircraft passenger suite according to claim 1, wherein the controller is configured to:
receive an instruction to initiate electro-mechanical movement of the table;
initiate electro-mechanical movement of the table in response to receiving the instruction;
receive, after initiating electro-mechanical movement of the table, an indication of whether or not an obstacle is present on the table path; and
in response to a received indication that an obstacle is present on the table path, cease electro-mechanical movement of the table.

13. The aircraft passenger suite according to claim 1, wherein the controller is configured to:
receive an indication from the sensing equipment that an obstacle is present on the table path;
receive an instruction to initiate electro-mechanical movement of the table; and
prevent electro-mechanical movement of the table.

14. The aircraft passenger suite according to claim 1, wherein the controller is configured to provide an alert if the controller receives an indication that an obstacle is present on the table path.

15. The aircraft passenger suite according to claim 1, wherein the controller is configured to:
receive a second, subsequent indication from the sensing equipment that no obstacle is present on the table path; and
in response to the second indication, initiate electro-mechanical movement of the table along the table path.

16. A method of controlling electro-mechanical movement of a table in an aircraft passenger suite, the table being moveably mounted to a console and moveable relative to the console along a table path between a first position and a second position, the method comprising:
receiving an instruction to initiate electro-mechanical movement of the table;
receiving, from sensing equipment, an indication of whether or not an obstacle is present on the table path; and
preventing electro-mechanical movement of the table if an indication that an obstacle is present on the table path is received,
wherein the electro-mechanical movement of the table is prevented before the table could make contact with the obstacle.

17. The method according to claim 16, the method comprising:
initiating electro-mechanical movement of the table in response to receiving the instruction;
receiving, after initiating electro-mechanical movement of the table, an indication of whether or not an obstacle is present on the table path; and
in response to a received indication that an obstacle is present on the table path, ceasing electro-mechanical movement of the table.

18. The method according to claim 16, the method comprising, in the following order:
receiving an indication from the sensing equipment that an obstacle is present on the table path;
receiving an instruction to initiate electro-mechanical movement of the table; and
preventing electro-mechanical movement of the table.

19. The method according to claim 16, the method comprising:
receiving an indication from the sensing equipment of whether or not an obstacle is present on the table path; and
in response to a received indication that no obstacle is present on the table path, initiating electro-mechanical movement of the table along the table path.

* * * * *